(12) United States Patent
Fitzpatrick et al.

(10) Patent No.: US 7,593,886 B2
(45) Date of Patent: Sep. 22, 2009

(54) METHOD AND SYSTEM FOR PROVIDING RULE-BASED COLLATERAL ALLOCATION AND SUBSTITUTION

(75) Inventors: David Fitzpatrick, Morrisville, PA (US); William G Riggio, Basking Ridge, NJ (US)

(73) Assignee: ICAP Services North America LLC, Jersey City, NJ (US)

( * ) Notice: Subject to any disclaimer, the term of this patent is extended or adjusted under 35 U.S.C. 154(b) by 1056 days.

(21) Appl. No.: 10/632,149

(22) Filed: Jul. 30, 2003

(65) Prior Publication Data

US 2004/0093301 A1    May 13, 2004

Related U.S. Application Data

(60) Provisional application No. 60/399,903, filed on Jul. 30, 2002.

(51) Int. Cl.
*G06F 17/60* (2006.01)

(52) U.S. Cl. .................. 705/37; 705/35; 705/36; 715/866; 902/25

(58) Field of Classification Search ............... 705/1–80; 700/213–233; 902/1–30; 235/40
See application file for complete search history.

(56) References Cited

U.S. PATENT DOCUMENTS

| | | | |
|---|---|---|---|
| 4,745,559 A | 5/1988 | Willis et al. | |
| 6,014,627 A | 1/2000 | Togher et al. | |
| 6,233,566 B1 | 5/2001 | Levine et al. | |
| 6,278,982 B1 | 8/2001 | Korhammer et al. | |
| 2001/0037284 A1* | 11/2001 | Finkelstein et al. | 705/37 |

* cited by examiner

*Primary Examiner*—James P Trammell
*Assistant Examiner*—Marissa Liu
(74) *Attorney, Agent, or Firm*—Dickstein, Shapiro, LLP.

(57) ABSTRACT

A system and method are disclosed for managing collateral allocation and substitution in general collateral repurchase agreements. In a preferred embodiment, an intermediary computer system facilitates the execution of anonymous general collateral repurchase agreements between buyers and sellers. The intermediary system manages initial collateral allocations and substitutions in accordance with systematic and impartial rules.

9 Claims, 6 Drawing Sheets

US 7,593,886 B2

METHOD AND SYSTEM FOR PROVIDING RULE-BASED COLLATERAL ALLOCATION AND SUBSTITUTION

CROSS-REFERENCE TO RELATED APPLICATIONS

This application claims priority to provisional patent application Ser. No. 60/399,903, filed Jul. 30, 2002, entitled Method and System for Allocation of Securities Used As Collateral In Repurchase Agreements, which is hereby incorporated herein by reference in its entirety for each of its teachings and embodiments.

BACKGROUND OF THE INVENTION

General collateral repurchase agreements are agreements in which one or more parties agree to buy a nominal amount of collateral for a predefined period of time and in return to provide the seller with "initial consideration" equal to the market value of the collateral purchased. At the end of the period, the collateral is sold back to the seller in return for "end consideration" equal to the initial consideration plus interest for the defined period at a negotiated rate. Market convention dictates that these repurchase agreements may be traded with the following maturity options: constant maturity date (e.g., overnight, 1 week, 1 month); fixed maturity date (e.g., cash to Sep. 30, 2003); or forward start and maturity date (e.g., from Jul. 1 to Jul. 31, 2003).

Unlike certain types of repurchase agreements in which the collateral being sold is named as part of the definition of the repurchase agreement instrument, general collateral repurchase agreements do not have specific collateral issues named as an integral part of the repurchase agreement instrument. After trade execution, the seller is required to select or allocate the collateral being sold from a defined basket of securities.

Typically, the seller is also permitted to substitute initially allocated securities with other securities during the agreement period. A number of rights of substitution is established for each piece of allocated collateral that specifies the number of times the collateral may be substituted.

The buyer and seller typically transact through an intermediary to preserve their anonymity. The intermediary acts as a counterparty to both the seller and buyer, and passes transaction information to the relevant parties.

In a typical repurchase agreement, the buyer and seller determine the start and end dates of the repurchase agreement that they wish to trade, as well as the number of rights of substitution applied to the collateral.

The interest rate applicable to the repurchase agreement may be a fixed or a variable rate. The value of the end consideration is adjusted when the variable rate changes within the repurchase agreement period. The value of the end consideration is also adjusted when the market value of the collateral changes due to a substitution. Any changes in market value of the securities lent during the repurchase agreement period due to market price fluctuation are handled independently of the intermediary by external clearing entities through margin calls on the seller and buyer.

In the past, collateral allocations and substitutions have been arbitrarily controlled by the intermediary conducting the trade. For example, the intermediary was free to arbitrarily select the order of allocations and substitutions amongst buyers in a multi-party transaction. This often resulted in the collateral of particular buyers being substituted in a disproportionately high number of cases while the collateral allocations of other buyers were preserved.

SUMMARY OF THE INVENTION

A system and method are disclosed for managing collateral allocation and substitution in general collateral repurchase agreements. In a preferred embodiment, an intermediary computer system facilitates the execution of anonymous general collateral repurchase agreements between buyers and sellers. The intermediary system manages initial collateral allocations and substitutions in accordance with systematic and impartial rules.

In one aspect, a preferred embodiment of the present invention comprises a system for managing collateral allocation and substitution in general collateral repurchase agreements, comprising a plurality of trader terminals, an intermediary computer system adapted to communicate with each trader terminal via one or more communication links, facilitate agreements between buyers and sellers for sale of collateral, receive allocation instructions for an agreement from a seller trading terminal, store information regarding collateral that has been allocated and mark said collateral as allocated, receive substitution instructions from a seller trading terminal to substitute allocated collateral, wherein: if there is one buyer who is allocated the exact amount of collateral that the seller wishes to substitute, that buyer is substituted; otherwise, if there is one buyer who is allocated a higher amount of the collateral that the seller wishes to substitute, and that amount is sufficient for the substitution, that one buyer is substituted; and otherwise, buyers have their collateral substituted on the basis of a priority determination.

In another aspect, only buyers with allocated collateral having equal rights of substitution to collateral allocated by the seller are eligible for the substitution.

In another aspect, the priority determination is a time priority determination.

In another aspect, at least one of the communication links is established via a virtual private network.

In another aspect, at least one of the communication links is established via a private line.

In another aspect, at least one of the communication links is established via the Internet.

In another aspect, a preferred embodiment of the present invention comprises a method for managing collateral allocation and substitution in general collateral repurchase agreements comprising an intermediary system for storing information regarding the collateral, enabling buyers and sellers to enter into agreements for sale of said collateral, receiving allocation instructions for an agreement from a seller, storing information regarding collateral that has been allocated and marking collateral as allocated, receiving substitution instructions from a seller to substitute allocated collateral, wherein collateral is allocated and substituted according to systematic and impartial rules.

In another aspect, the buyers and sellers remain anonymous to each other during the repurchase transaction.

In another aspect, collateral that has been allocated by the seller is first allocated to buyers on the basis of time priority.

In another aspect, if the seller desires to substitute collateral that has been allocated to a particular transaction, buyers have their collateral substituted according to the following rule: If there is one buyer who is allocated the exact amount of collateral that the seller wishes to substitute, that buyer is used for the substitution, otherwise, if there is one buyer who is allocated a higher amount of the collateral that the seller wishes to substitute, and that amount is sufficient for the substitution, that one buyer is used for the substitution, otherwise, buyers have their collateral substituted on the basis of time priority.

The present system and method may be adapted for processing different types of agreements including money fill and par fill transactions.

BRIEF DESCRIPTION OF THE DRAWINGS

The above summary of the invention will be better understood when taken in conjunction with the following detailed description and accompanying drawings in which.

DETAILED DESCRIPTION OF THE PREFERRED EMBODIMENTS

Figure 1:
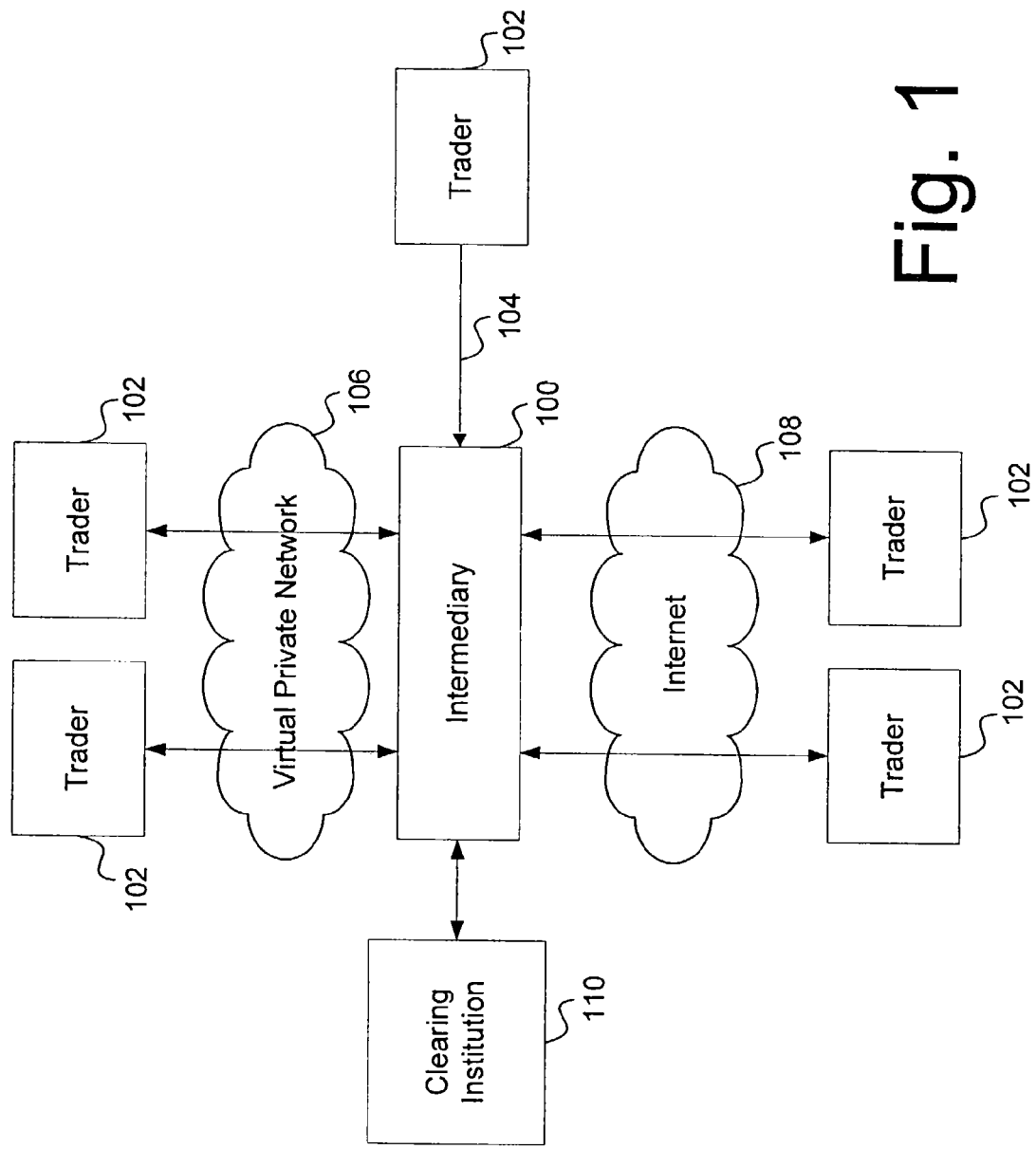
FIG. 1 is a block diagram illustrating a preferred embodiment of a system for trading general collateral repurchase agreements and managing the allocation and substitution of collateral in connection with such agreements.

A preferred embodiment of a system for trading general collateral repurchase agreements and managing the allocation and substitution of collateral in connection with such agreements is shown in FIG. 1. As shown in FIG. 1, the system preferably comprises an intermediary computer system 100 and a plurality of trader terminals 102. Trader terminals 102 are adapted to communicate with intermediary computer system 100 via suitable communication means such as a private line 104, virtual private networks 106, and Internet 108. Intermediary 100 preferably comprises one or more processors and storage media suitable for implementing the architecture and processing described below. Also shown in FIG. 1 is a clearing institution 110 adapted for transferring funds between system participants.

Figure 2:
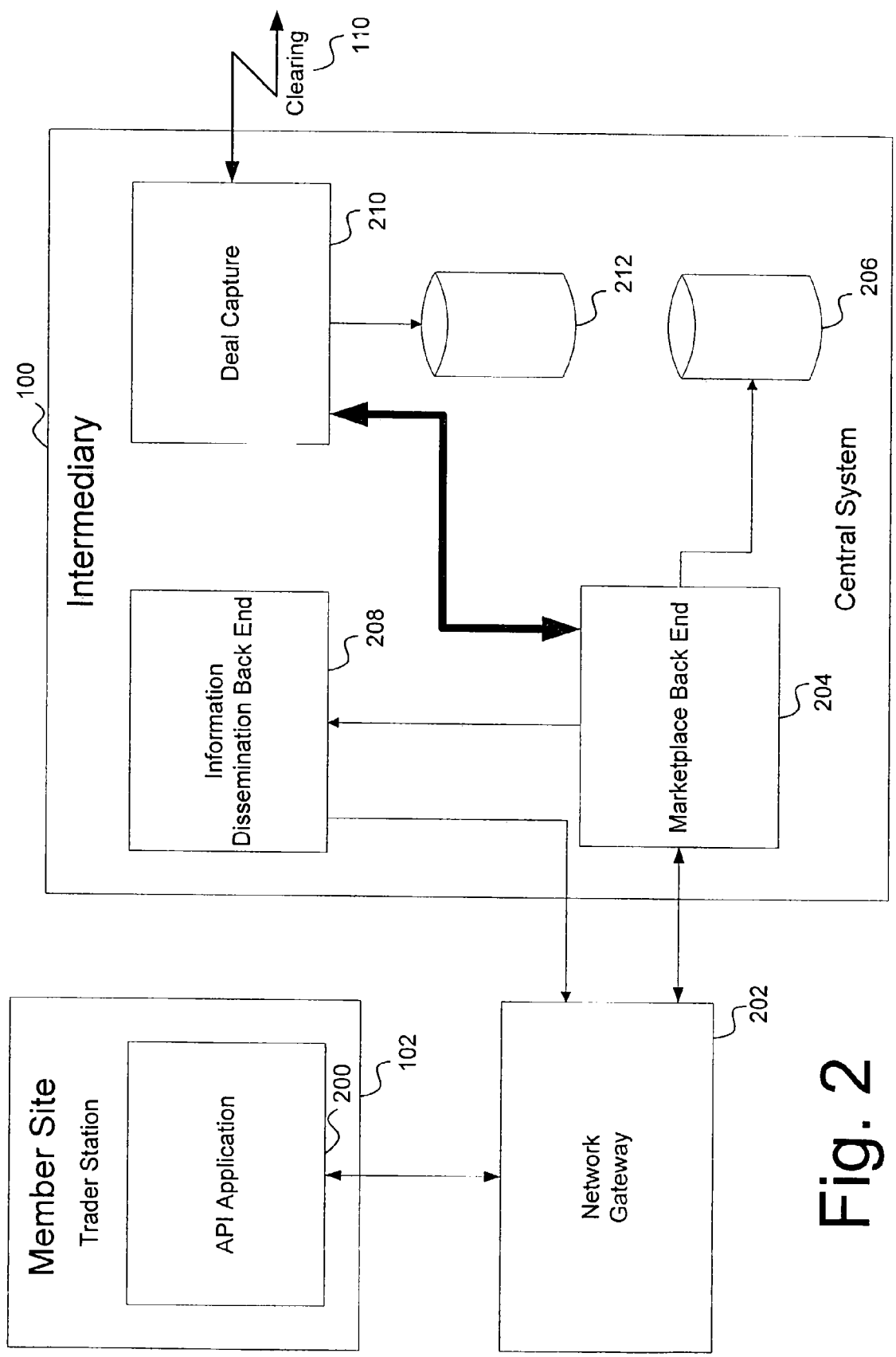
FIG. 2 is a block diagram illustrating aspects of the preferred embodiment of FIG. 1 in more detail.

Aspects of the system shown in FIG. 1 are shown in more detail in FIG. 2. As shown in FIG. 2, each trader terminal 102 preferably comprises an API 200 to provide an interface for communication with intermediary 100. In the embodiment of FIG. 2, traders access the intermediary through a suitable network gateway 202. A marketplace back end 204 receives orders entered via trader terminals 102 and stores them in electronic storage medium 206. An information dissemination back end 208 disseminates information concerning executed trades to network gateway 202. Deal capture 210 collects and stores in electronic storage medium 212 all transactions executed on the intermediary system.

A preferred embodiment of the operation of the present system will now be described in connection with FIGS. 3A-D.

In step 302, a buyer and seller enter into a general collateral repurchase agreement via the intermediary system. In step 304, the intermediary system displays a list of eligible collateral which conforms to the maturity requirements of the relevant general collateral basket. In a preferred embodiment, collateral allocations may be fixed in defined tranches, or pieces. For example, the maximum par amount of collateral accepted by a clearing institution 110 may be 50 million in quantity.

In some embodiments, sellers of collateral are preferably not required to allocate all at once the total amount of collateral specified in an agreement. However, the allocation must preferably be completed prior to a specified deadline on the start date of the trade. For example, market convention today stipulates that all trades done before 10:30 a.m. on the trade date (including trades done on a previous trade date), must be allocated in full before 11:00 a.m. If the trade was effected after 10:30 a.m., a rolling half hour applies.

In step 306, the seller selects the collateral it wishes to allocate from a list of eligible securities transmitted to it by intermediary 100. The market values of the collateral to be allocated are preferably displayed to the parties to the agreement at the time of allocation. If a clean price is entered, the system computes the dirty price, i.e., the clean price (or quoted price of the security) plus the accrued interest. Alternatively, in some embodiments, prices may be centrally distributed and traders may have no ability to enter their own clean or dirty prices.

In decision 308, the intermediary checks to see whether the seller has allocated enough collateral for the transaction or if the time to allocate has expired. If the seller fails to allocate collateral on a timely basis, the system invokes a market control application which issues a warning to the seller (step 310). Alternatively, in some embodiments, a default security specified by the trader before commencement of trading may be automatically allocated. Traders may be required to specify such a default security as a condition to commencing trading.

In a preferred embodiment, where a single seller has executed with multiple buyers, the present system allocates collateral to the buyers based on the time priority of their orders (step 312). Thus, if the seller allocates in full, all buyers receive their collateral, but if the seller allocates only partially, the buyers who came to the market later receive their collateral after buyers with earlier orders are completely allocated.

In a preferred embodiment, the system disseminates electronic messages to alert buyers that collateral has been allocated or substituted. These messages are preferably delivered precisely as each allocation/substitution is performed to facilitate security clearance and reduce the potential for fails to deliver.

As collateral for the trade is allocated, intermediary 100 calculates the initial payment and end payment to be made by the buyer (step 314). The initial payment is preferably calculated as follows.

$$\sum_{i=1}^{n} \frac{(\text{Par value of security } i) * (\text{Clean Price of security } i + \text{Accrued Interest for security } i)}{100}$$

where n=number of securities allocated and "clean price" is the quoted price of the security.

Preferably, the system calculates consideration for forward start agreements based on the prices of collateral as of the allocation date.

In step 316, the buyer pays the initial amount to the seller and receives the collateral from the seller. This initial payment may be handled by a clearing institution 110, a bank, or another institution as agreed upon by the parties. The intermediary marks the collateral as fully allocated in the system.

Figure 3A:
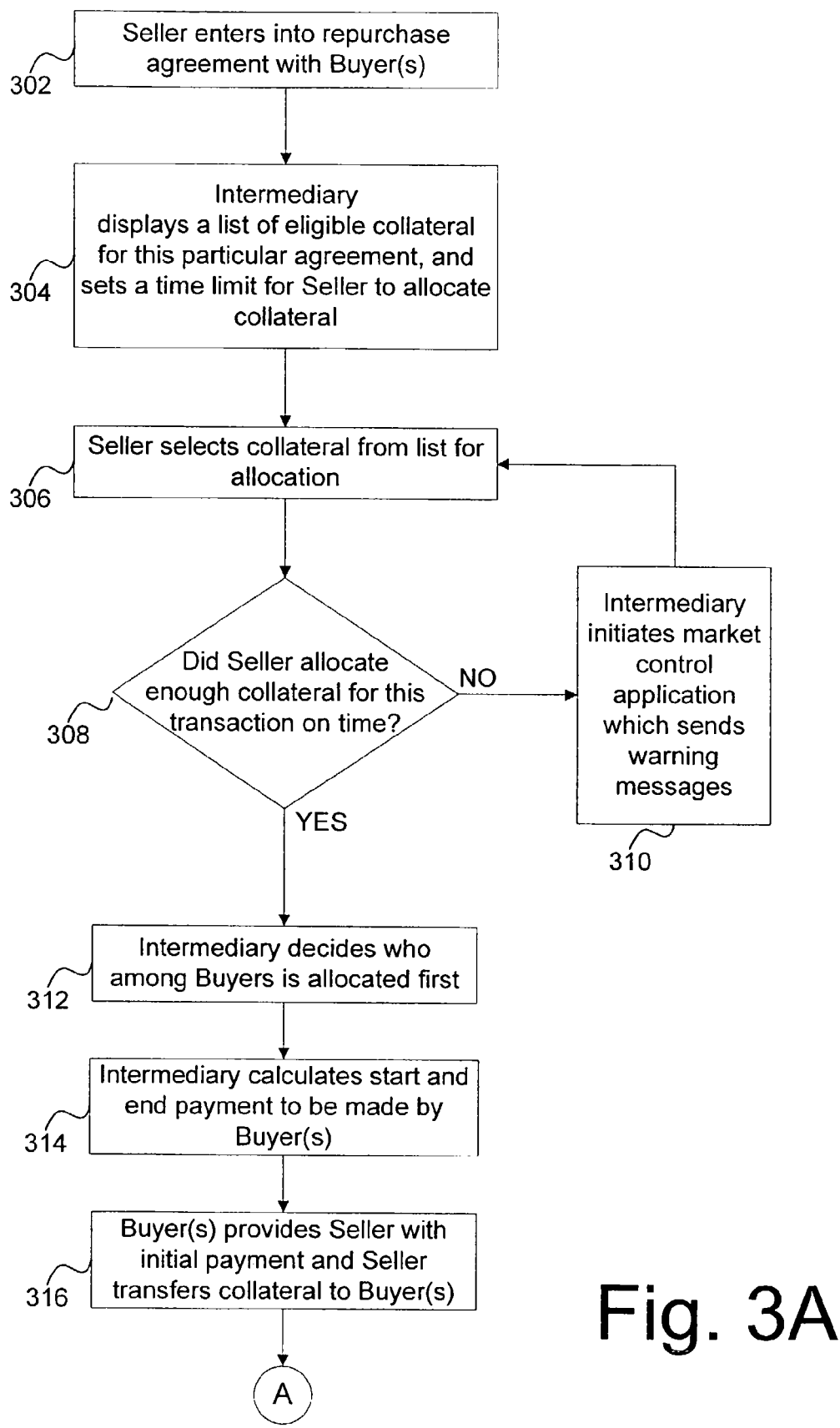
FIGS. 3A-D is a flowchart illustrating a preferred embodiment of the operation of the system shown in FIG. 1.
Figure 3B:
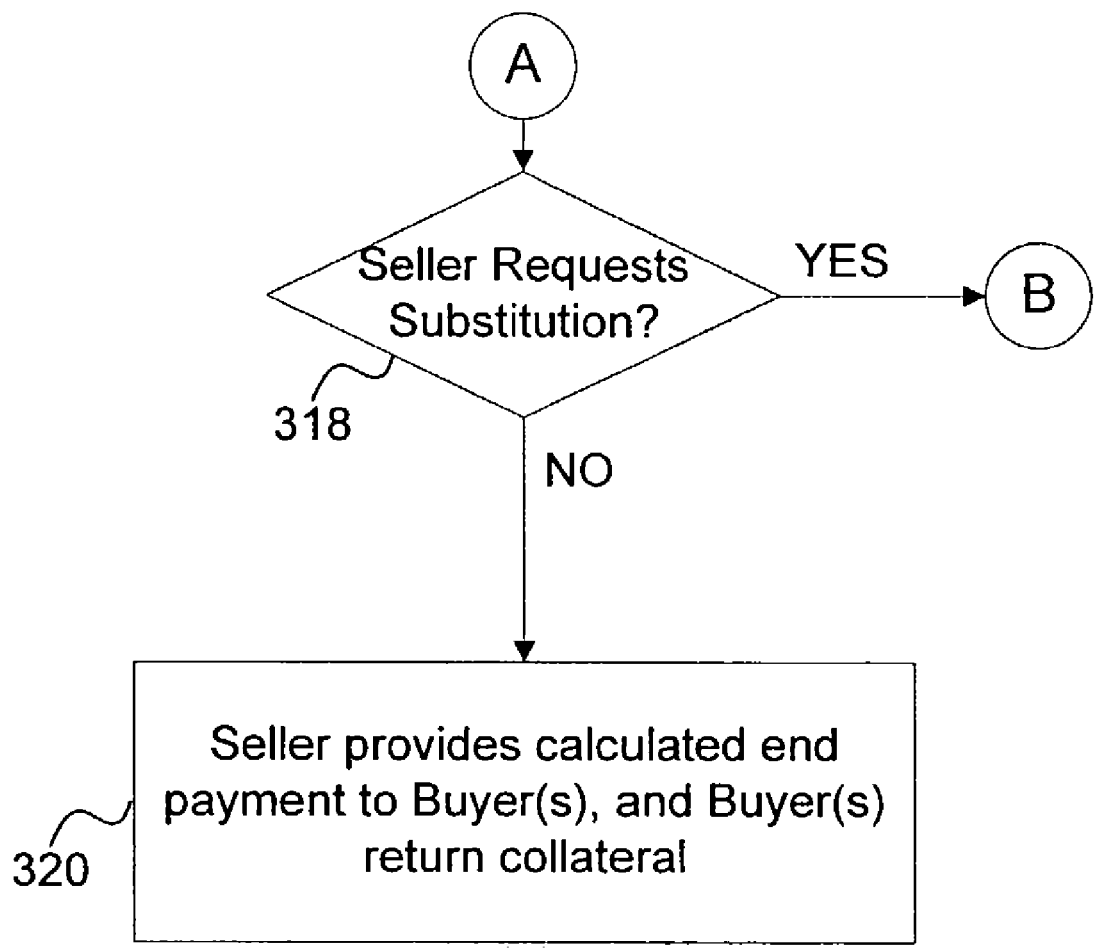
Figure 3C:
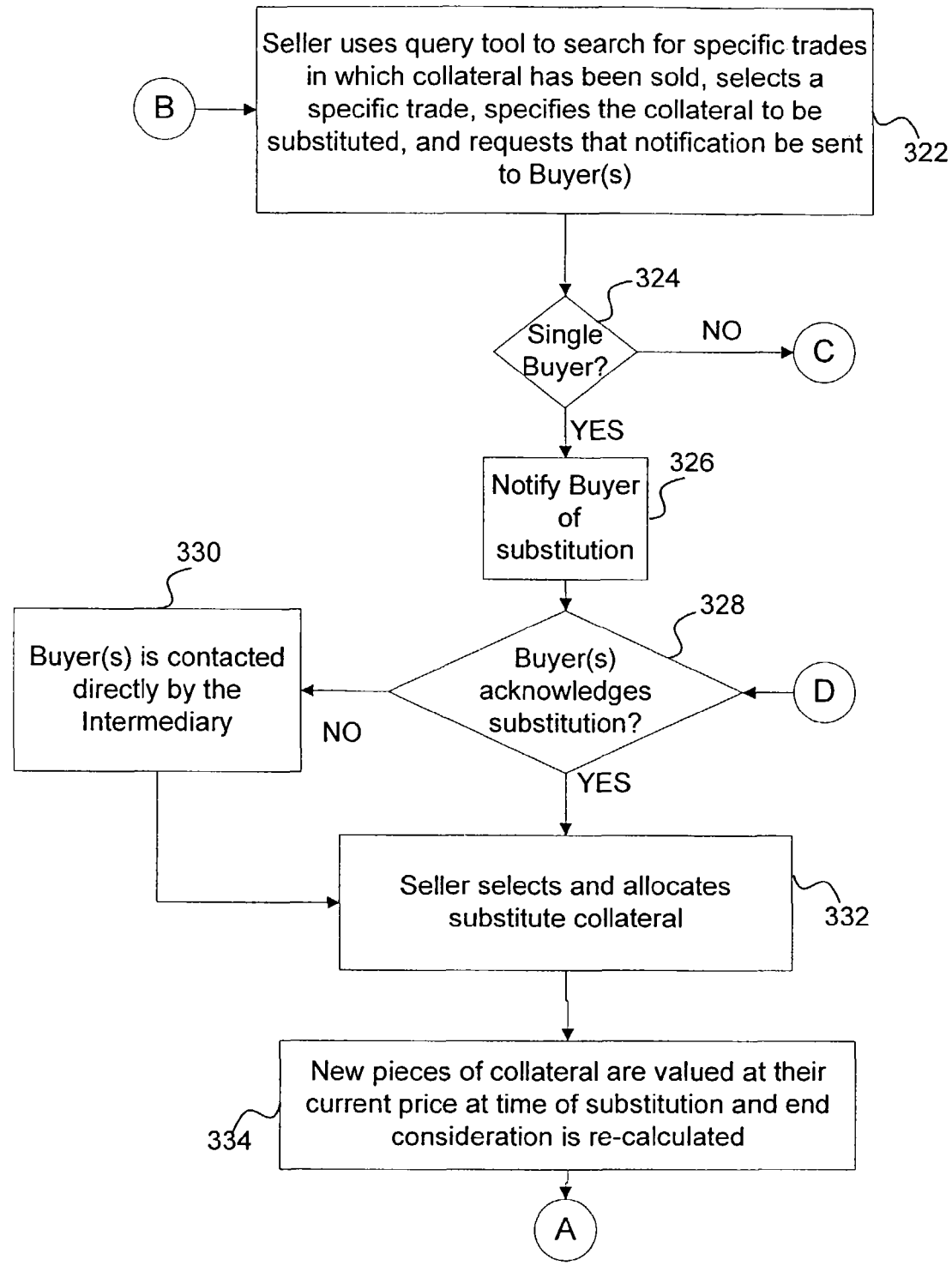
Figure 3D:
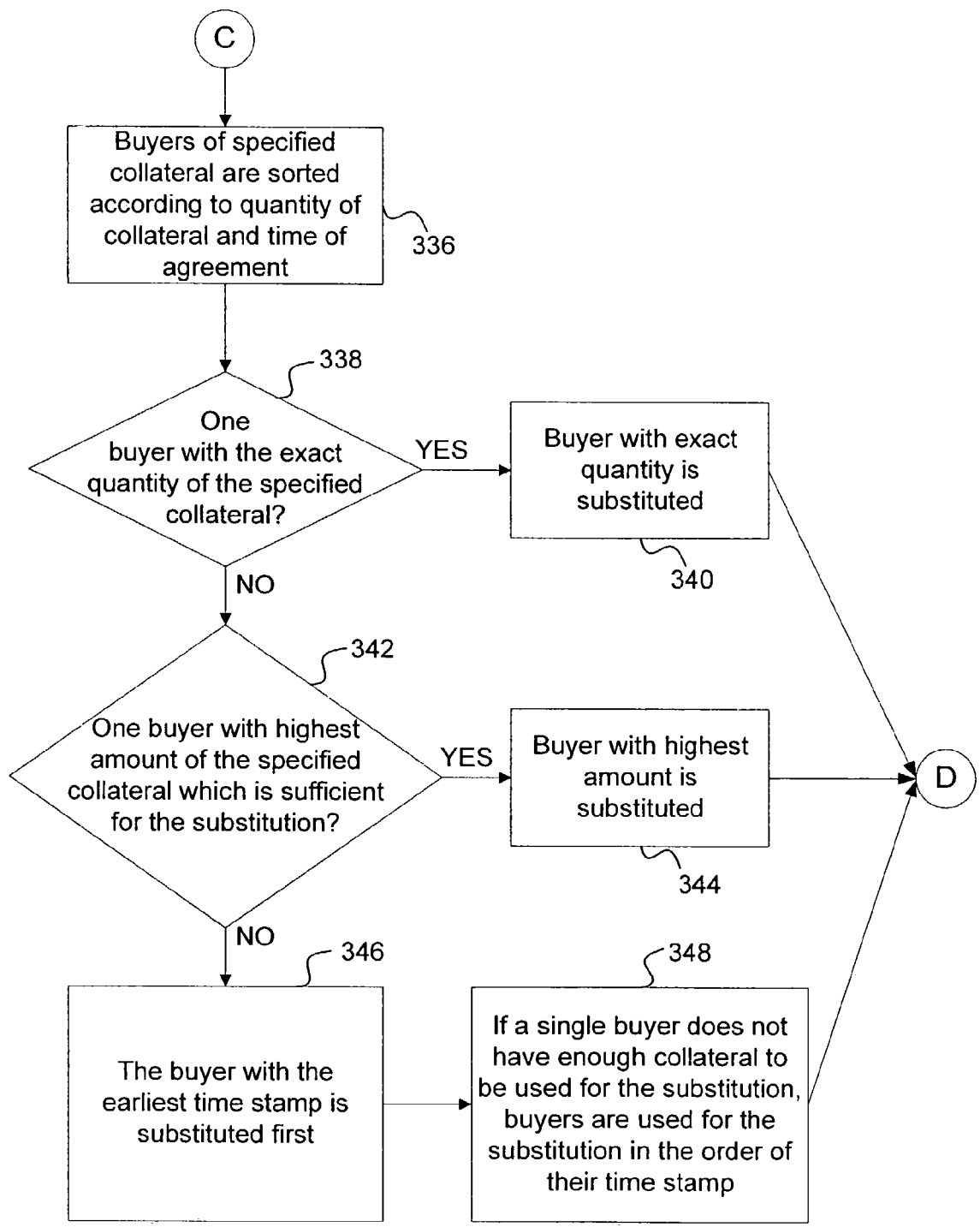

If, during the life of the agreement, a seller desires to substitute currently-allocated collateral (decision 318), processing proceeds to step 322 in FIG. 3C. A preferred embodiment for handling such substitutions is described in more detail below. The system may enforce a rule that sellers are not allowed to substitute collateral on the date of initial allocation.

In step 320, at the end of the repurchase agreement period, the seller provides the end payment to the buyer in consideration for which the buyer transfers the collateral back to the seller.

The end payment may preferably be calculated as follows:

End consideration=Initial consideration+Interest for the agreement period

Where: interest for the agreement period=Initial consideration*rate*(agreement period/day basis)

The system preferably allows for the ability to change prices of collateral even after allocation has been completed. In such cases, the payments are recomputed and seller, the buyer(s), and the clearinghouse are notified.

As noted, during the agreement period, the seller may substitute initially allocated securities with other securities while keeping the total par value of collateral constant. Each piece of collateral used in an agreement is preferably assigned a specific number of rights of substitution, or ROS. For each agreement, this number specifies how many times the seller may substitute each piece of collateral. Each buyer in an agreement also has a corresponding ROS value which indicates how many times during the course of the agreement that buyer may have each piece of their collateral substituted. Alternatively, in some embodiments, ROS may be assigned for the trade as a whole, and not separately for each piece of allocated collateral.

Turning to FIG. 3C, in step 322, the seller selects the collateral to be substituted. In a preferred embodiment, the seller is provided with a query tool adapted to display for a security specified by a trader, a list of the trader's trades where the security is currently allocated as collateral and is eligible for substitution. The trader is then able to select a trade from this query list and specify the amount of the collateral to be substituted in the selected trade. The maturity of collateral selected should not require more substitutions than allowed under the ROS for a particular piece. Thus, if the remaining ROS is 1 for a collateral piece, a collateral with maturity date less than the end date is not permitted. In a preferred embodiment, allocated collateral with a certain number of remaining ROS is eligible for substitution only with original counterparties to the selected trade and only with respect to pieces of collateral held by those counterparties that have the same number of remaining ROSs.

In the case where there are multiple buyers (decision 324), processing proceeds to step 336 where buyers of the specified collateral are sorted according to quantity of collateral and time that they entered the agreement with the seller. If there is one buyer who is currently allocated the exact amount of collateral to be substituted (decision 338), that one buyer is used for the substitution (step 340). If there is not one buyer with the exact amount of collateral specified by the seller, the intermediary then searches for one buyer with the highest amount of the specified collateral (decision 342). If one is found with collateral sufficient for the substitution, that one buyer has their collateral substituted (step 344). Otherwise, if there are two or more buyers with the same quantity of the specified collateral, the buyer at that quantity with the earliest time stamp (in other words, the buyer that first entered into the agreement with the seller) is substituted first (step 346). If that buyer's collateral is not sufficient for the substitution, remaining buyers are used for the substitution in the order of their priority based on quantity of collateral and time stamp (step 348). After a trader has been substituted, a modified time is attached to its portion of the trade. Any subsequent substitution will refer to this modified time to determine the order in which buyers in a multi-party transaction are substituted.

In step 326, the intermediary notifies the buyer or buyers who will be substituted. If the buyer or buyers fail to acknowledge the substitution (decision 328), they are contacted directly by a representative of the entity operating the intermediary system (step 330).

In step 332, the seller selects and allocates the collateral to be substituted. The new piece of collateral is valued at its current price at the time of substitution and the buyer's end consideration is recalculated (step 334). Alternatively, in some embodiments, the system may calculate a quantity of the substitute collateral to allocate such that the end consideration that will be due to the buyer remains constant.

In a preferred embodiment, only the newly allocated piece of collateral is valued at the current price. The price of the initial unsubstituted collateral remains unchanged. This recalculated consideration is referred to as the new consideration.

The system is preferably adapted to track and display to the trader the remaining number of substitutions for each piece of allocated collateral in a selected trade. For example, assume an initial trade of 200 MM, allocated in 450 MM tranches each of which has 2 ROS. Assume further that the trader first requests a substitution for 100 MM and then requests a second substitution for 200 MM. In this case, the status of the collateral in the trade will preferably be as follows:

| Initial | After 1st Substitution | After 2nd Substitution |
| --- | --- | --- |
| 50-2R | 50-1R | 50-0R |
| 50-2R | 50-1R | 50-0R |
| 50-2R | 50-2R | 50-1R |
| 50-2R | 50-2R | 50-1R |

At the conclusion of the repurchase agreement period, the seller pays the end consideration to the buyer (step 320). The interest earned on the initial consideration from the start date to the substitution date is added to the value computed for new consideration from the substitution date to the end date to arrive at the new end consideration. Thus, for example, when a single substitution occurs during the agreement period, the end consideration is calculated as follows:

End consideration=[Initial consideration*rate*((repurchase agreement substitution date−start date)/day basis)]+New consideration+New consideration*rate*(end date−repurchase agreement substitution date)/day basis))]

The intermediary may optionally use a facility to set times for various market operations that restrict traders from performing certain actions, and generate warning messages to prompt traders that time deadlines are imminent. Messages are automatically transmitted to sellers who have not allocated or substituted in accordance with market convention. In the past, collateral warnings have been arbitrarily disseminated by the intermediary often resulting in preferential treatment for some sellers.

Examples of intermediary time limit settings are:

Allocation deadline for all agreements when done before a certain hard limit.

Allocation period for all agreements against which a rolling (relative to agreement time) limit applies.

Allocation deadlines for agreements done on days previous to the settlement day (forward trades).

Final allocation deadline: no allocations for same day settlement may take place after this time limit, unless the trade is overridden by the intermediary.

Notification deadline: last chance for seller to notify a buyer of an intent to substitute collateral.

Substitution deadline: time deadline under which new collateral must be submitted.

Warning message settings describing when first warnings are sent to the appropriate trader(s), and frequency intervals for repeated warning messages.

The present system preferably comprises a market control application adapted to provide a surveillance tool used by the intermediary to monitor the status of allocations and substitutions. The application permits viewing of all trades that are executed via the intermediary. Windows in the market control application are typically filtered for trades that require allocation/substitution for the current day. Windows can also be filtered to view historical trades with a specific (or range of) start date, end date, number of rights of substitution, and rate.

Using the market control application, individuals employed by the entity that operates the intermediary system preferably conduct day to day market surveillance to ensure that allocations and substitutions are performed on a timely basis. The application also preferably displays to the staff whether a substitution has been acknowledged by the buyer. Because responding to substitutions is time sensitive, if a substitution is not acknowledged, the application prompts the intermediary staff to call the buyer to inform him or her of the substitution.

Additionally, if the user experiences system problems (e.g., loss of connectivity), the staff may use the market control application to execute any and all transactions on behalf of the user. The market control application is also preferably equipped with administrative tools to cancel or modify allocations and substitutions that were performed in error.

In the market control application, time limits are preferably set relative to the deadlines associated with allocations and substitutions. These deadlines may be extended globally or on an individual trade basis, e.g. in the event of market conditions, system problems, etc. Warning time intervals, before and after deadlines are reached, are also preferably controlled in the market control application.

The following examples illustrate aspects of preferred embodiments of the present system.

Example 1

Consideration Calculation for General Collateral Repurchase Allocation

Suppose A has bought $200 MM worth of collateral from B on a general collateral repurchase agreement. The rate for the agreement (i.e. market price for the agreement) is 10% and the period is 90 days. The collateral specified by B initially is as follows:

| Security | Par 1 value | Dirty Price (Clean price + Accrued Interest) | Start Consideration ($) | End Consideration ($) |
|---|---|---|---|---|
| W | 50 | 102 | 51.00 | 52.275 |
| W | 50 | 102 | 51.00 | 52.275 |
| X | 50 | 98 | 49.00 | 50.225 |
| Y | 50 | 85 | 42.50 | 43.5625 |
| Total | 200 | | 193.50 | 198.34 |

Therefore on value date, B provides A with 200 MM in par of security W, X, and Y.

A provides B with the initial consideration which is $193.50 MM at 10% for a period of 90 days.

End consideration=$198.34 MM

Example 2

Consideration Calculation for General Collateral Substitution

Suppose that the initial general collateral repurchase agreement transaction was for a nominal value of $200 MM @10% for a period of 90 days.

| Security | Parvalue | Dirty Price (Clean price + AI) | Start Consideration ($) | End Consideration ($) |
|---|---|---|---|---|
| W | 50 | 102 | 51.00 | 52.275 |
| W | 50 | 102 | 51.00 | 52.275 |
| X | 50 | 98 | 49.00 | 50.225 |
| Y | 50 | 85 | 42.50 | 43.5625 |
| Total | 200 | | 193.50 | 198.34 |

A is the buyer and B the seller of collateral.

Initial Start consideration: $193.50 MM

Initial End consideration: $ 198.34 MM

Suppose security X is substituted by Security Z with a dirty price of 95 after 30 days

| Security | Par value | Dirty Price (Clean price + AI) | Start Consideration ($) | End Consideration ($) |
|---|---|---|---|---|
| W | 50 | 102 | 51.00 | 52.275 |
| W | 50 | 102 | 51.00 | 52.275 |
| Z | 50 | 95 | 47.50 | 0.4083333 + 48.2916666 |
| Y | 50 | 85 | 42.50 | 43.5625 |
| Total | 200 | | 192.00 | 196.81 |

The new end consideration for the piece of collateral is:

[Initial consideration*rate*((agreement substitution date−start date)/day basis)]+New consideration+ New consideration*rate*(end date−agreement substitution subs date)/day basis))]

=(49.00*10/100*30/360)+47.50*(1+10/100*60/360)

=0.4083333+48.2916666

=48.6999999

Total End Consideration=$196.81 MM

Example 3

Substitution for General Collateral Repurchase Agreement

Substitutions are preferably carried out as per the following rules:

1. Eligible Collateral

The only possible candidates for completion of a substitution are the other sides of the original trade.

When deciding which buyer to complete a substitution, always use an allocation with equal rights of substitution within the same security.

2. Substitution Sequence

Sort the eligible collateral by quantity and execution order time.

Substitute the first piece of collateral that exactly matches the required quantity.

If no collateral matches the quantity exactly, fill the collateral in order from the sorted list Example of a $250 mm trade with one seller (Seller 1) of $250 mm and 3 buyers of $50 mm (Buyer 1 at 13:01:30), $100 mm (Buyer 2 at 13:01:43), and $100 mm (Buyer 3 at 13:02:07). The initial allocation is accomplished using one security (SEC A), and the agreement has 3 rights of substitution (3R). After allocation the following exists:

| | REVR (Buyers) | REPO (Sellers) |
|---|---|---|
| Buyer 2 | 100 (Sec A) (3R) | 250 (Sec A) (3R) |
| Buyer 3 | 100 (Sec A) (3R) | |
| Buyer 1 | 50 (Sec A) (3R) | |

1. Seller Subs 50 mm of (Sec A) with 50 mm of (Sec B)

| | REVR (Buyers) | REPO (Sellers) | |
|---|---|---|---|
| Buyer 2 | 100 (Sec A) (3R) | 200 (Sec A) (3R) | Chose exact |
| Buyer 3 | 100 (Sec A) (3R) | 50 (Sec B) (2R) | amount with |
| Buyer 1 | 50 (Sec B) (2R) | | matching sec, ROS |

2. Seller Subs 100 mm of (Sec A) with 50 mm of (Sec B) and 50 mm of (Sec C)

| | REVR (Buyers) | REPO (Sellers) | |
|---|---|---|---|
| Buyer 3 | 100 (Sec A) (3R) | 100 (Sec A) (3R) | Chose oldest |
| Buyer 1 | 50 (Sec B) (2R) | 50 (Sec B) (2R) | order with |
| Buyer 2 | 50 (Sec B) (2R) | 50 (Sec B) (2R) | matching sec, |
| Buyer 2 | 50 (Sec C) (2R) | 50 (Sec C) (2R) | amount, ROS |

3. On another day, seller subs 50 mm of (Sec B) with 50 mm of (Sec A). Sec-B is replacement collateral and cannot be re-subbed on the same day.

| | REVR (Buyers) | REPO (Sellers) | |
|---|---|---|---|
| Buyer 3 | 100 (Sec A) (3R) | 100 (Sec A) (3R) | Chose older |
| Buyer 1 | 50 (Sec A) (1R) | 50 (Sec A) (1R) | sub/alloc |
| Buyer 2 | 50 (See B) (2R) | 50 (Sec B) (2R) | with |
| Buyer 2 | 50 (Sec C) (2R) | 50 (Sec C) (2R) | matching sec, amount, ROS. |

4. Seller Subs 100 mm of (Sec A 3R) with 100 mm of (Sec B)

| | REVR (Buyers) | REPO (Sellers) | |
|---|---|---|---|
| Buyer 3 | 100 (Sec B) (2R) | 100 (Sec B) (2R) | Matches sec, |
| Buyer 1 | 50 (Sec A) (1R) | 50 (Sec A) (1R) | amount, |
| Buyer 2 | 50 (Sec B) (2R) | 50 (Sec B) (2R) | ROS. |
| Buyer 2 | 50 (Sec C) (2R) | 50 (Sec C) (2R) | |

5. Seller Subs 50 mm of (Sec B) with 50 mm of (Sec D)

| | REVR (Buyers) | REPO (Sellers) | |
|---|---|---|---|
| Buyer 3 | 100 (Sec B) (2R) | 100 (Sec B) (2R) | Matches sec, |
| Buyer 1 | 50 (Sec A) (1R) | 50 (Sec A) (1R) | amount, |
| Buyer 2 | 50 (Sec D) (1R) | 50 (Sec D) (1R) | ROS. |
| Buyer 2 | 50 (Sec C) (2R) | 50 (Sec C) (2R) | |

6. On another day, Seller Subs 100 mm of (Sec B) & 50 mm of (Sec A) with 150 mm of (Sec E)

| | REVR (Buyers) | REPO (Sellers) | |
|---|---|---|---|
| Buyer 3 | 100 (Sec E) (1R) | 100 (Sec E) (1R) | Exact match |
| Buyer 1 | 50 (Sec E) (0R) | 50 (Sec E) (0R) | with Buyer 3. |
| Buyer 2 | 50 (Sec D) (1R) | 50 (Sec D) (1R) | Exact match |
| Buyer 2 | 50 (Sec C) (2R) | 50 (Sec C) (2R) | with Buyer 1. |

7. On another day, Seller Subs 100 mm of (Sec E) & 50 mm of (Sec D) with 150 mm of (Sec F)

| | REVR (Buyers) | REPO (Sellers) | |
|---|---|---|---|
| Buyer 3 | 100 (Sec F) (0R) | 100 (Sec F) (0R) | Exact match |
| Buyer 1 | 50 (Sec E) (0R) | 50 (Sec E) (0R) | with Buyer 3. |
| Buyer 2 | 50 (Sec F) (0R) | 50 (Sec F) (0R) | Exact match |
| Buyer 2 | 50 (Sec C) (2R) | 50 (Sec C) (2R) | with Buyer 2. |

Example 4

Consideration Calculation for General Collateral Repo Allocation (European Union Example)

General collateral repurchase agreements in the European Union may be traded on a "classic" reverse repurchase (RRP) or buy sell back (BSB) basis. If the agreement is on a RRP basis, even though the securities are sold out, the seller remains the owner of the securities and continues to receive the coupons during the agreement period. Therefore, the end consideration is not adjusted for coupon payments.

If the agreement is traded on a BSB basis, the ownership is passed to the buyer of securities (i.e. the buyer receives the coupons paid during the agreement period). Hence, the end consideration to be paid by the seller of securities is adjusted for coupon payments.

European Union forward repurchase agreements are agreements with start days in the future. In a preferred embodiment, such agreements may differ from other general collateral repurchase agreements traded with forward start dates in that the system will impose no requirement to allocate collateral within one hour of a trade. The system preferably automatically uses a default dummy instrument specified by the clearing institution for such forward general collateral trades to allocate until the sellers allocate the proper collateral. Sellers are only allowed to allocate the actual collateral on the date, which is two business days before the start date of the transaction. On this date, the system warns users of any forward transactions which remain unallocated. Allocations must preferably be completed before 3:00 p.m. (this cut-off time is preferably configurable). Collateral allocated is preferably valued by adding the accrued interest from last coupon date to settlement date to the clean price as of allocation date.

Note that the substitution of the proper collateral preferably does not count as a substitution and thus will not result in a reduction of the seller's rights of substitution. Forward repurchase agreement start dates can be configured be greater than T+D days (with D, e.g., set at 7 days).

Suppose A is the buyer and B the seller of collateral. A provides B with funds to the value of collateral bought (initial consideration) from start date (value date) up to end date (repo date) of the transaction at an agreed rate.

On value date,

B sells collateral to A

A provides B with initial consideration=

$$\sum_{i=1}^{n} \frac{(\text{Par value of security } i) * (\text{Clean Price of security } i + \text{Accrued Interest for security } i)}{100}$$

Where n=number of securities allocated

The start dirty price is preferably rounded to two decimals before calculating the initial consideration On repo date A returns collateral to B If the trade was a RRP, B provides A with the end consideration =Initial consideration+Interest for the repo period =(Initial consideration (1+*rate*(repo period/day basis))

If the trade was a BSB, B provides A with the end consideration

=Initial consideration+Interest for the repo period+Coupon amount−Interest earned on coupon amount between coupon date and repo date)

=(Initial consideration (1+*rate*(repo period/day basis))+ Coupon amount−Interest earned on coupon amount between coupon date and repo date)

Example 5

General Collateral Repurchase Agreement with Substitution (European Union Example)

Suppose A has sold €200 MM worth of collateral to B on a RRP. The rate for the agreement is 10% and the period is 30 days. The collateral specified by A initially is as follows:

| Security | Nominal value | Dirty Price | Consideration (Euro) |
|---|---|---|---|
| W | 100 | 102 | 102.00 |
| X | 77 | 98 | 75.46 |
| Y | 48 | 86 | 41.28 |
| Total | 225 | | 218.74 |

Therefore on value date, A provides B with 200 MM in nominal value of security W, X, and Y. B provides A with 218.74 MM at 10% for a period of 1 month.

end consideration=Initial consideration+Interest on the agreement

=218.74*(1+10/100*30/365)

=€ 220.54

It should be noted that the day count may vary as a function of the bond, market, and currency.

Suppose now that the seller requires 65 of security X to be substituted using 55 of security Z and he selects the above trade done with B from his query list for the substitution.

Assume that the current prices for security X is 102.

| Security | Nominal value | Dirty Price | Consideration (€) |
|---|---|---|---|
| W | 100 | 102 | 102.00 |
| X | 77 | 102 | 78.54 |
| Y | 48 | 86 | 41.28 |
| Total | 225 | | 221.82 |

The value to be substituted

=Nominal value of security X*dirty price

=65*102

=€66.30

The nominal amount of securities Z required to keep the consideration constant is preferably computed to the nearest million.

Assume that the dirty price of security Z is €125.50

Therefore the nominal value of Z required

=Value to be substituted/Dirty price of Z

=€ 66.30/€ (125.50/100)

=52.83

=53 MM (rounded to nearest million)

Since the nominal value of security Z required for the substitution is rounded up to the nearest million, the price of Z is adjusted accordingly.

Therefore the dirty price of Z

=Value to be substituted/Nominal value of Z required

=€66.30/(53/100)

=€125.09

The scenario after the substitution:

| Security | Nominal value | Dirty Price | Consideration (€) |
|---|---|---|---|
| W | 100 | 102 | 102.00 |
| X | 12 | 102 | 12.24 |
| Y | 48 | 86 | 41.28 |
| Z | 53 | 125.09 | 66.30 |
| Total | 188 | | 221.82 |

Note: Even though the nominal value has changed, the consideration of the agreement as of substitution date remains unchanged after the substitution. The buyer, the seller, and the clearinghouse are preferably notified of the substitution. The principle is that no cash changes hands, there is only a replacement of collateral. The slight discrepancy in the dirty price of Z is handled by central counter party margining, as happens each day when the value of collateral varies.

Example 6

Reverse Repo Transaction (US)

Bond Details

| | |
|---|---|
| Coupon Rate = | 6% |
| Last Coupon Date (LCD) = | 01 Nov. 1999 |
| Maturity = | 01 Dec. 2005 |
| Accrual Basis = | Actual/Actual |
| Days between Coupons = | 182 |

Deal Details

| | |
|---|---|
| Nominal (Face Value) = | 1,000,000.00 |
| Repo Rate (Interest Rate) = | 5% p.a. |
| Value Date (Start Date) = | 17 Apr. 2000 |
| Repo Date (End Date) = | 30 Jun. 2000 |
| Tenure (Repo – Value date) = | 74 days |
| Days between LCD and Value date = | 168 days |
| Clean Price = | 100 |
| Coupon Accrued to Value date = | 100 * 168/182 * 6%/2 = 2.76923 |
| Buy Price (Dirty) = | Clean Price + Accrued Interest = 100 + 2.76923 = 102.76923 = 102.75 (rounded down to the nearest 1/8$^{th}$) |
| Initial Consideration = (Start Cashflow) | 1,027,500.00 |
| Initial End consideration (End Cashflow) = | Consideration + Repo Interest Accrued (i.e. 5% for 74 days) = 1,027,500.00 + (1,027,500.00 * 5% * 74/360) = 1,027,500.00 + 10,560.42 = 1,038,060.42 |

Example 7

Bond Details

| | |
|---|---|
| Coupon Rate = | 6% |
| Last Coupon Date (LCD) = | 01 Nov. 1999 |
| Maturity = | 01 Dec. 2005 |
| Accrual Basis = | Actual/Actual |
| Days between Coupons = | 182 |

Deal Details

| | |
|---|---|
| Nominal (Face Value) = | 1,000,000.00 |
| Initial Consideration (Start = Cashflow) | 1,027,692.30 (i.e. 1,000,000 + 27,692.30) |
| Repo Rate (Interest Rate) = | 5% p.a. |
| Value Date (Start Date) = | 17 Apr. 2000 |
| Repo Date (End Date) = | 30 Jun. 2000 |
| Tenure (Repo – Value date) = | 74 days |
| Days between LCD and Value date = | 168 days (Used to calculate accrued Coupon-EU) |
| Clean Price = | 100 |
| Coupon Accrued to Value date = | 1,000,000.00 * 168/182 * 6%/2 = 27,692.30 |

Calculated Values:

| | |
|---|---|
| Buy Price (Dirty) = | Consideration/(Nominal/100) = (1,027,692.30/1,000,000.00) * 100 = 102.76923 |
| Initial End consideration (End Cashflow) = | Consideration + Repo Interest Accrued (i.e. 5% for 74 days) = 1,027,692.30 + (1,027,692.30 * 5% * 74/360) = 1,027,692.30 + 10,562.39 = 1,038,254.69 |
| Initial Sell Price (Dirty) = | End Cashflow/(Nominal/100) = 1,038,254.69/10,000 = 103.825469 |

Example 8

Bond Details

| | |
|---|---|
| Coupon Rate = | 6% |
| Last Coupon Date (LCD) = | 01 Nov. 1999 |
| Maturity = | 01 Dec. 2005 |
| Accrual Basis = | Actual/Actual |
| Days between Coupons = | 182 |

Deal Details

| | |
|---|---|
| Nominal (Face Value) = | 1,000,000.00 |
| Initial Consideration (Start Cashflow) = | 1,027,692.30 (i.e. 1,000,000 + 27,692.30) |
| Repo Rate (Interest Rate) = | 5% p.a. |
| Value Date (Start Date) = | 17 Apr. 2000 |
| Repo Date (End Date) = | 30 Jun. 2000 |
| Tenure (Repo – Value date) = | 74 days |
| Days between LCD and Value date = | 168 days (Used to calculate accrued Coupon-EU) |
| Clean Price = | 100 |
| Coupon Accrued to Value date = | 1,000,000.00 * 168/182 * 6%/2 = 27,692.30 |

Calculated Values:

| | |
|---|---|
| Buy Price (Dirty) = | Consideration/(Nominal/100) = (1,027,692.30/1,000,000.00) * 100 = 102.76923 |
| Initial End consideration (End Cashflow) = | Consideration + Repo Interest Accrued (i.e. 5% for 74 days) = 1,027,692.30 + (1,027,692.30 * 5% * 74/360) = 1,027,692.30 + 10,562.39 = 1,038,254.69 |

-continued

| | |
|---|---|
| Initial Sell Price (Dirty) = | End Cashflow/(Nominal/100) = 1,038,254.69/10,000 = 103.825469 |

While the invention has been described in conjunction with specific embodiments, it is evident that numerous alternatives, modifications, and variations will be apparent to those skilled in the art in light of the foregoing description.

The invention claimed is:

1. A system for managing collateral allocation and substitution in general collateral repurchase agreements, comprising:
   a plurality of trader terminals;
   an intermediary computer system adapted to:
      communicate with each trader terminal via one or more communication links;
      facilitate agreements between buyers and sellers for sale of collateral;
      receive allocation instructions for an agreement from a seller trading terminal;
      store information regarding collateral that has been allocated and mark said collateral as allocated;
      receive substitution instructions from a seller trading terminal to substitute allocated collateral, wherein:
         if there is one buyer who is allocated the exact amount of collateral that the seller wishes to substitute, that buyer is substituted;
         otherwise, if there is one buyer who is allocated a higher amount of the collateral that the seller wishes to substitute, and that amount is sufficient for the substitution, that one buyer is substituted; and
         otherwise, buyers have their collateral substituted on the basis of a priority determination.

2. The system of claim 1, wherein only buyers with allocated collateral having equal rights of substitution to collateral allocated by the seller are eligible for the substitution.

3. The system of claim 1, wherein the priority determination is a time priority determination.

4. The system of claim 1, wherein at least one of the communication links is established via a virtual private network.

5. The system of claim 1, wherein at least one of the communication links is established via a private line.

6. The system of claim 1, wherein at least one of the communication links is established via the Internet.

7. A method for managing collateral allocation and substitution in general collateral repurchase agreements, comprising:
   receiving allocation instructions for an agreement from a seller trading terminal;
   storing information regarding collateral that has been allocated and marking said collateral as allocated;
   receiving substitution instructions from a seller trading terminal to substitute allocated collateral, wherein
      when there is one buyer who is allocated the exact amount of collateral that the seller wishes to substitute, that buyer is substituted;
      when there is no one buyer who is allocated the exact amount of the collateral that the seller wishes to substitute but there is one buyer who is allocated a higher amount of the collateral that the seller wishes to substitute, and that amount is sufficient for the substitution, that one buyer is substituted; and
      when there is no one buyer who is allocated the exact amount of the collateral that the seller wishes to substitute, there is no one buyer who is allocated a higher amount of the collateral that the seller wishes to substitute, buyers have their collateral substituted on the basis of a priority determination.

8. The method of claim 7, wherein only buyers with allocated collateral having equal rights of substitution to collateral allocated by the seller are eligible for the substitution.

9. The method of claim 7, wherein the priority determination is a time priority determination.

* * * * *

UNITED STATES PATENT AND TRADEMARK OFFICE
CERTIFICATE OF CORRECTION

PATENT NO.        : 7,593,886 B2                                          Page 1 of 1
APPLICATION NO. : 10/632149
DATED             : September 22, 2009
INVENTOR(S)       : David R. Fitzpatrick et al.

It is certified that error appears in the above-identified patent and that said Letters Patent is hereby corrected as shown below:

*Delete text beginning with col. 16, line 10 (claim 7) to line 38 (claim 9)*

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,593,886 B2  Page 1 of 1
APPLICATION NO. : 10/632149
DATED : September 22, 2009
INVENTOR(S) : Fitzpatrick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1724 days.

Signed and Sealed this

Twenty-eighth Day of September, 2010

David J. Kappos
*Director of the United States Patent and Trademark Office*